(No Model.)
E. BOETTCHER.
SECONDARY BATTERY.
No. 543,372. Patented July 23, 1895.
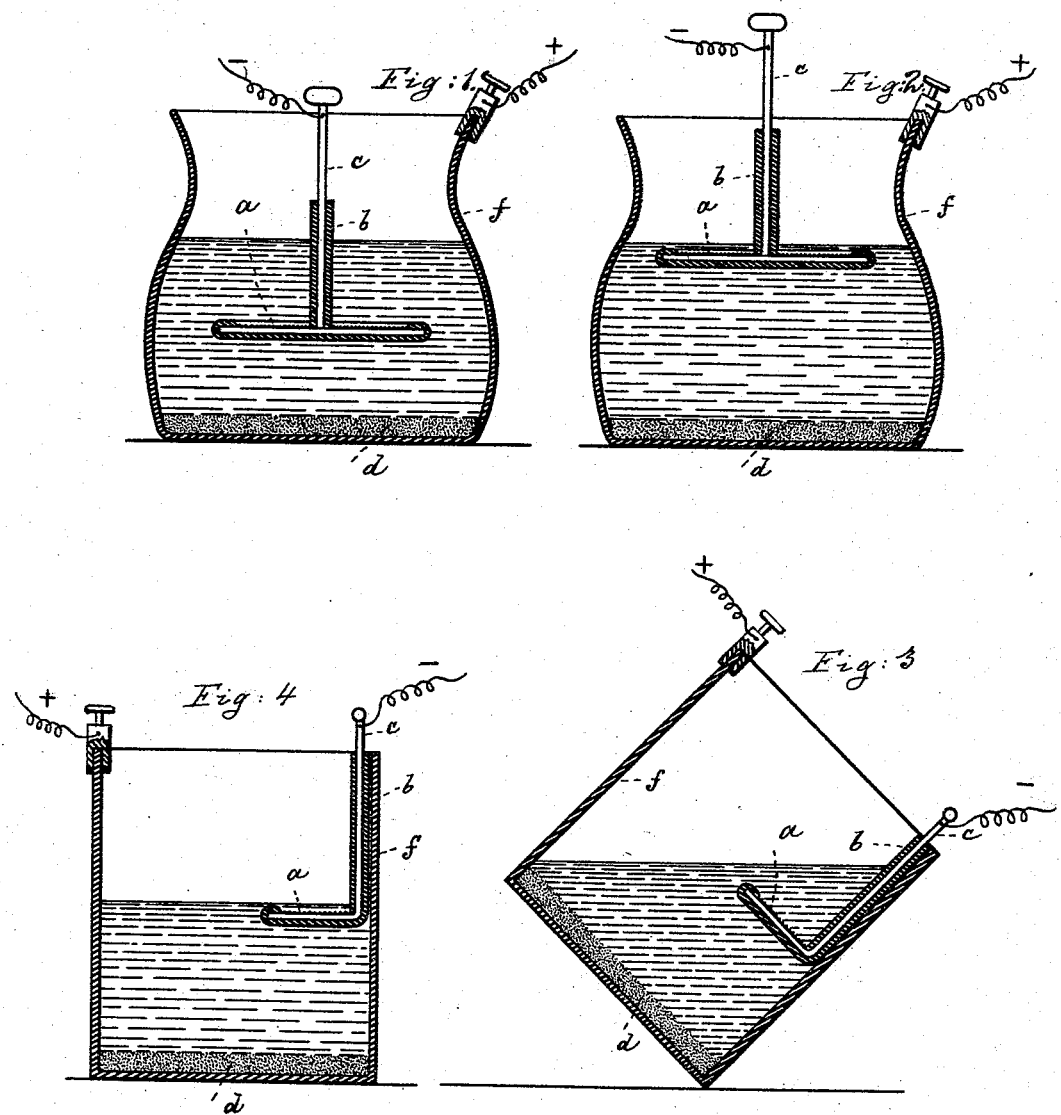
Witnesses:
Wm Wagner
A Poughmans
Inventor:
E. Boettcher
by his attorneys
Roeder & Brieun

UNITED STATES PATENT OFFICE.

EMIL BOETTCHER, OF LEIPSIC, GERMANY.

SECONDARY BATTERY.

SPECIFICATION forming part of Letters Patent No. 543,372, dated July 23, 1895.

Application filed May 12, 1890. Serial No. 351,445. (No model.)

*To all whom it may concern:*

Be it known that I, EMIL BOETTCHER, of Leipsic, in the Kingdom of Saxony, Germany, have invented a new and useful Improvement in Secondary Batteries, of which the following is a specification.

This invention relates to a secondary or storage battery of novel construction; and it consists in the various features of improvement more fully pointed out in the claim.

In the accompanying drawings, Figure 1 is a vertical central section of my improved secondary battery with the cathode lowered. Fig. 2 is a similar section with the cathode raised. Figs. 3 and 4 are similar views of a modification.

The precipitation of the zinc from a concentrated solution of zinc oxide in potash or soda lye is effected by immersing the zinc cathode $a$ deep into said solution. By a sufficiently-strong current the zinc will be precipitated in the shape of coarse granular crystals upon the horizontal upper surface of the cathode, so as to adhere to such surface. The lower surface and rim, as well as the vertical conducting-stem $c$ of the cathode, are protected against contact with the liquid by a cap $b$ of vulcanized caoutchouc or of any other non-conducting and alkali-resisting substance. The liberated alkali dissolves in the water and rises to the upper portion of the liquid. The oxygen liberated at the anode combines with the porous metallic copper on the bottom of the iron vessel $f$ and forms oxide of copper $d$. After the battery is charged, the cathode is raised to nearly the surface of the potash solution, as shown in Fig. 2. The discharge can now take place at any time and with convenient interruptions in the usual manner. The relatively-deep position of the cathode in charging is necessary, as otherwise the zinc would be precipitated in a spongy non-adhering condition and not in the compact adhering form. This relatively-deep immersion can also be obtained by tilting the vessel $f$, as in Fig. 3, toward the cathode. In this modification the cathode extends horizontally almost to the center of the vessel, and is thus deeply immersed when the vessel is tilted. For the purpose of discharging the battery the latter is first righted, as in Fig. 4.

The porous metallic copper is obtained by heating powdered oxide of copper with reducing substances containing carbon.

My improved element has an electromotive power of 0.85 volt, which remains constant in discharging for a long time and is not subject to spontaneous deterioration, an advantage not possessed by any other accumulator of the present day, as far as I am aware. The element remains unchanged for any length of time and can be used at intervals, as desired.

What I claim is—

A battery containing a zinc oxide solution, a zinc cathode and a non-conducting covering that extends over the lower surface, the rim and the vertical stem of the cathode, substantially as specified.

In testimony whereof I have signed my name to this specification in the presence of two subscribing witnesses.

EMIL BOETTCHER.

Witnesses:
MAX MATTHÁI,
CARL BORNGRAEBER.